United States Patent [19]
Burkhardt

[11] Patent Number: 5,059,330
[45] Date of Patent: Oct. 22, 1991

[54] GRAY WATER RECLAMATION METHOD AND APPARATUS

[76] Inventor: Donald O. Burkhardt, 4265 N. Mountain Rd., Marietta, Ga. 30066

[21] Appl. No.: 503,528

[22] Filed: Apr. 2, 1990

[51] Int. Cl.⁵ .............................................. E03D 5/016
[52] U.S. Cl. ..................... 210/744; 210/734; 210/747; 210/749; 210/754; 210/800; 210/104; 210/105; 210/122; 210/209; 210/257.1; 210/532.1; 210/538; 210/534; 4/300
[58] Field of Search ............... 210/104, 105, 122, 170, 210/206, 207, 209, 257.1, 532.1, 538, 539, 739, 744, 747, 749, 754, 800; 4/300

[56] References Cited

U.S. PATENT DOCUMENTS

| | | | |
|---|---|---|---|
| 4,011,162 | 3/1977 | Oldham et al. | 210/121 |
| 4,032,995 | 7/1977 | Kemper | 4/10 |
| 4,162,218 | 7/1979 | McCormick | 210/167 |
| 4,168,231 | 9/1979 | Allen et al. | 210/74 |
| 4,168,232 | 9/1979 | Allen et al. | 210/74 |
| 4,197,597 | 4/1980 | Toms | 210/138 |
| 4,350,587 | 9/1982 | Jarrell | 210/151 |
| 4,439,317 | 3/1984 | Jarrell | 210/151 |

Primary Examiner—Robert A. Dawson
Assistant Examiner—David Reifsnyder
Attorney, Agent, or Firm—Thomas, Kerr & Kayden

[57] ABSTRACT

An apparatus for cleansing gray water from showers and the like and reclaiming the cleansed water for reuse comprises a receptacle and a conduit for delivering gray water to the receptacle. A sensor detects flow of gray water into the receptacle and injects cleansing agents into the flow in response to such detection. A drain conduit communicates with the upper portion of the receptacle for extracting floating contaminants from the surface of gray water therein and a valved conduit communicates with the bottom of the receptacle for selectively extracting sinking contaminates therefrom. A pump is adapted to draw the resulting cleansed gray water from the receptacle and deliver it to a remote location for reuse as, for example, in flushing toilets.

6 Claims, 2 Drawing Sheets

GRAY WATER RECLAMATION METHOD AND APPARATUS

TECHNICAL FIELD

This invention relates to water conservation and particularly to reclamation and reuse of once-used gray water.

BACKGROUND OF THE INVENTION

Fresh water for human consumption and use has for decades been abundantly available in this and other countries generally through public utilities. As a result of such abundance, society has developed highly wasteful practices with respect to use of fresh water. A typical shower, for example can consume 60 to 80 gallons of fresh water which is usually simply discarded into the sewage system even though the water, which contains mostly only soap scum, is relatively uncontaminated. Such water is defined as gray water. Further examples of waste include discarding gray water from bathtubs (about 36 gallons per use), dishwashers (20-30 gallons per use) and washing machines 30-60 gallons per use), all of which gray water is relatively clean compared to, for example, raw sewage.

Such wasteful practices with respect to water usage in combination with the general growth and urbanization of modern populations is now beginning to result in water shortages in many areas that inevitably could grow into a nationwide water shortage crisis. Some more severely affected states of the United States have even enacted water conservation legislation to restrict use of fresh water by, for example, limiting the size of toilet reservoir tanks to limit water usage for flushing toilets.

At least one government study indicates that the U.S. population is now using fresh water at a rate greater than that at which the ground water table is being replenished by rainfall. Such conditions obviously cannot continue indefinitely.

Solutions to the problems of fresh water depletion have been suggested and implemented in the past with limited success. It has been suggested, for example, to capture gray water from showers, basins and the like and divert it for irrigation purposes such as the watering of lawns. While such reuse conserves some water, it is not entirely satisfactory because of the erratic and seasonal nature of irrigation demands. As mentioned above, another attempt to address the problem has included legislation to limit usage as, for example, by limiting the size of toilet reservoirs to limit water usage in flushing toilets. Such legislation is generally inadequate, however, to control personal usages, such as limiting the number of flushes per individual use and, in addition, represents governmental intervention which is unpopular with many people. Further, the reduction of toilet reservoir size tends to reduce the flushing efficiency of the toilet and can result in a shortage of fluid inhibiting the flow in the contiguous private system and in adjoining public sewage systems.

Thus, an increasingly urgent and as yet unaddressed need exists for a method and apparatus for significantly, consistently and reliably reducing residential and commercial use of fresh water without intrusion and without requiring sacrifice on the part of water users. It is to the provision of such a method and apparatus that the present invention is primarily directed.

SUMMARY OF THE INVENTION

The present invention is a method and enabling apparatus for significantly reducing household and commercial water usage by collecting and cleansing gray water from showers, basins and the like and reclaiming the cleansed water for reuse in flushing toilets. In a preferred embodiment, the invention comprises a receptacle in the form of a tank and a conduit system for delivering gray water from showers, basins and the like to the tank. A sensor detects the flow of gray water into the tank and injects a cleansing agent into the flow in response to such detection. As the collected and treated gray water stands in the tank, floating contaminants such as soap scum and the like tend to migrate to the surface of the water and sinking contaminants such as hair, food particles and the like tend to precipitate to the bottom of the tank.

A second conduit communicates at one end with the tank near the top thereof and at its other end with a drain. As additional gray water is delivered to the tank, the water level therein rises and ultimately reaches the second conduit whereupon surface liquid, including floating contaminates, flow through the second conduit to the drain and are thus extracted from the tank. Similarly, a third conduit communicates with the tank at its bottom and is configured for selective extraction of precipitated contaminants from the tank bottom to a drain by means of a valve that can be actuated to open and close communication through the third conduit.

A pump is configured to draw water from the tank at a location intermediate the surface of gray water therein and the tank bottom and deliver such water to a toilet reservoir tank for reuse in flushing the toilet. Since this water is drawn from intermediate levels within the tank, it is relatively free of contaminants that have floated or precipitated out of the water and further is generally cleansed by action of the cleansing agent. While the cleansed water is generally not suitable for human consumption, it is more than clean enough for reuse in toilet flushing.

A float value assembly within the tank is coupled to a water source and adapted to inject fresh water into the tank when gray water therein falls below a predetermined level thus insuring that water is always available in the tank for delivery and reuse even during peak flushing demands. In one embodiment for high volume commercial use, a pair of space shutter valves are positioned within the tank for selectively isolating floating and precipitated contaminants from cleansed water in the tank and pumps are provided for pumping the isolated contaminants from the tank and for pumping isolated cleansed gray water to a remote location for reuse.

Thus, a unique method and apparatus is now provided for significantly reducing domestic and commercial water usage by cleansing gray water and reclaiming the cleansed water for reuse in flushing toilets. Since an average person uses about 18,000 gallons of fresh water per year, of which 7,200 gallons are consumed in flushing toilets, the present invention has the potential of reducing fresh water usage by approximately 40%. Further, the apparatus of the invention is relatively economical, reliable, consistent and virtually transparent to its user. Also, since shower and bath frequencies are substantially the same throughout the year, water conservation with the present invention does not tend to be seasonal as with prior art solutions involving use of gray water in irrigation. These and other advantages,

DETAILED DESCRIPTION

Figure 1:
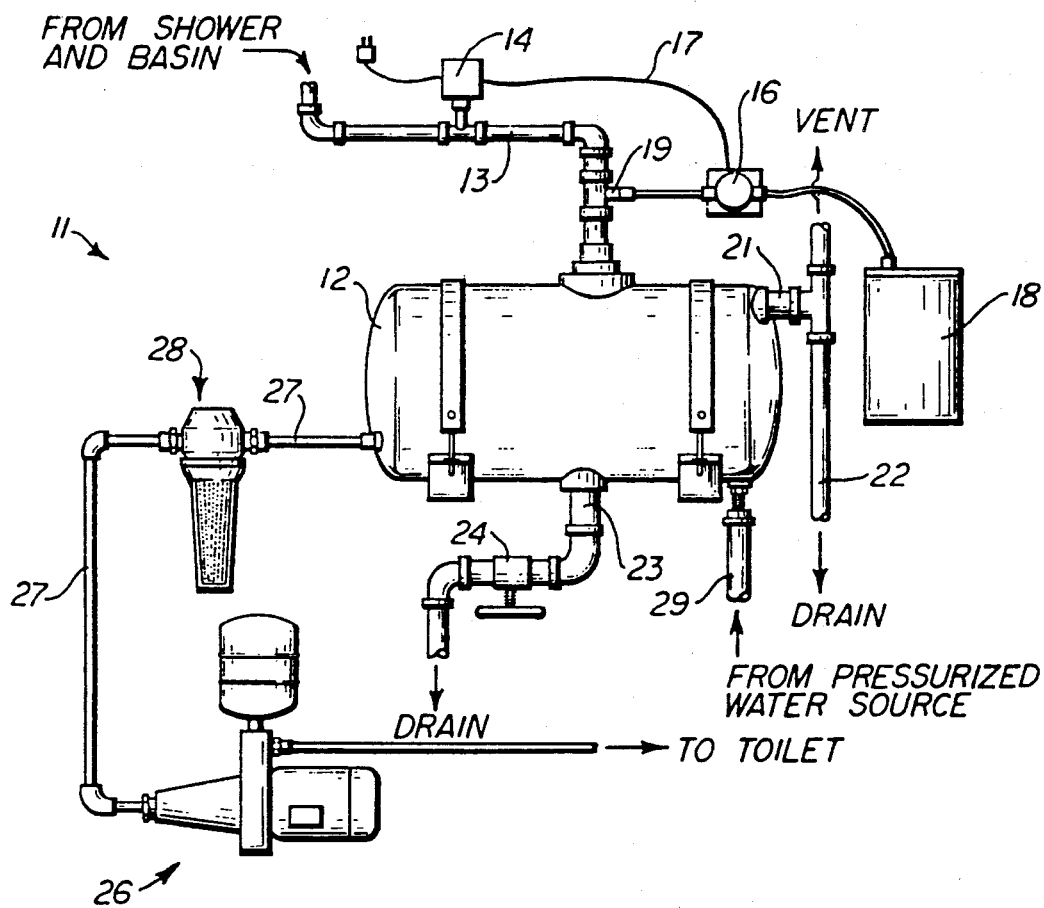
FIG. 1 is a side elevational view of an apparatus that embodies principals of the invention in a preferred form.

Referring now in more detail to the drawings, in which like numerals represent like parts throughout the several views, FIG. 1 illustrates an apparatus 11 for cleansing and reclaiming gray water that embodies principles of the invention in a preferred form. The apparatus 11 is seen to include a receptacle in the form of a tank 12 or other suitable vessel for receiving and containing gray water. A conduit 13 communicates with the tank 12 at its top and is coupled to the shower and basin drain system of a building in which the apparatus is installed for delivering gray water from such showers and basins to the tank 12. A flow switch 14 or other suitable detector senses the flow of gray water through the conduit 13 and, in response, activates a chemical pump 16 through an electrical wire 17. The pump 16 then draws a measured amount of cleaning agent from the chemical tank 18 and injects it into the flow of gray water by means of a nozzle 19 coupled to the conduit 13.

While any suitable sensor can be used to detect flow of gray water through the conduit 13, it has been found that the model FS4-3 flow switch available from the McDonnel and Miller company of Chicago, Ill. provides reliable and consistent detection in the configuration of the preferred embodiment. Similarly, a series 100 diaphragm type metering pump available from Lancaster Pump of Lancaster, Pa. has proven superior for injecting cleaning agent into the flow through conduit 13 primarily because of its adjustable flow rate feature. Finally, while many cleansing agents might be used to treat the gray water as it flows through conduit 13, simple liquid chlorine has been found to be economical and efficient for general cleansing and bacteria removal from the gray water.

A second conduit 21 communicates at one end with the tank 12 near the top thereof and at its other end with a drain pipe 22. Similarly, a third conduit 23 communicates at one end with the bottom of the tank and at its other end with a drain and includes a valve 24 for selectively opening and closing communication through the conduit 23. A pump 26 is adapted to draw water from the tank 12 at a location intermediate the tank bottom and the surface of gray water therein through a conduit 27 and deliver it to a toilet reservoir for use in flushing the toilet. A fibrous filter 28 is disposed along the conduit 27 for filtering particulates from water being pumped from the tank 12. Both the pump 26 and filter 28 are commonly available items. The pump, for example, can be obtained from the Peel Water Systems Company in Chicago, Ill. and bears model number 1P979F. A fibrous filter suitable for present purposes is available from the Omni Corporation of Hammond, Ind.

Figure 2:
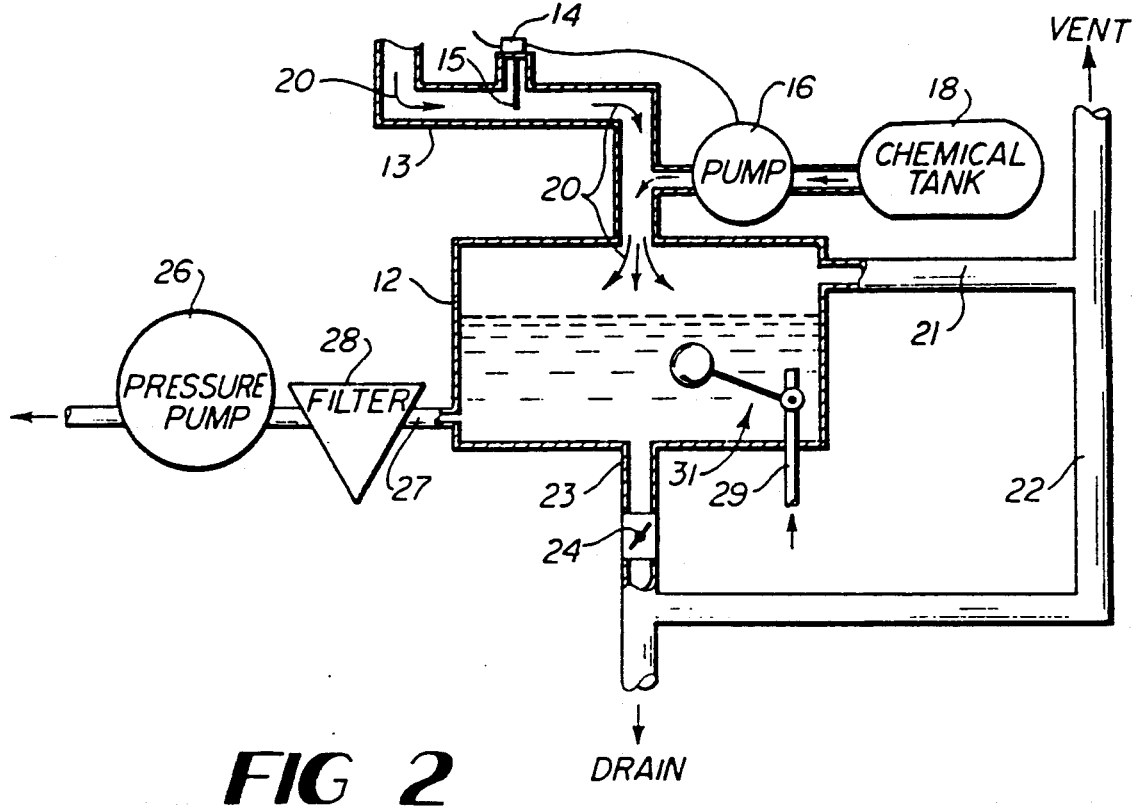
FIG. 2 is a diagrammatical partially sectional illustration of the apparatus of FIG. 1 showing operation of key functional elements thereof.

As best illustrated in FIG. 2, a pressurized water line 29 communicates with the tank 12 and is equipped for maintaining a predetermined water level in the tank. In this regard, a float valve assembly 31 within the tank 12 detects when gray water within the tank falls below a predetermined level and, in response to such detection, injects fresh water from water line 29 into the tank to maintain a minimum fluid level therein. This minimum level is chosen to be above the level in which conduit 27 communicates with the tank to insure that liquid is always available to be pumped from the tank for reuse even during peek usage of toilet facilities.

Figure 3:
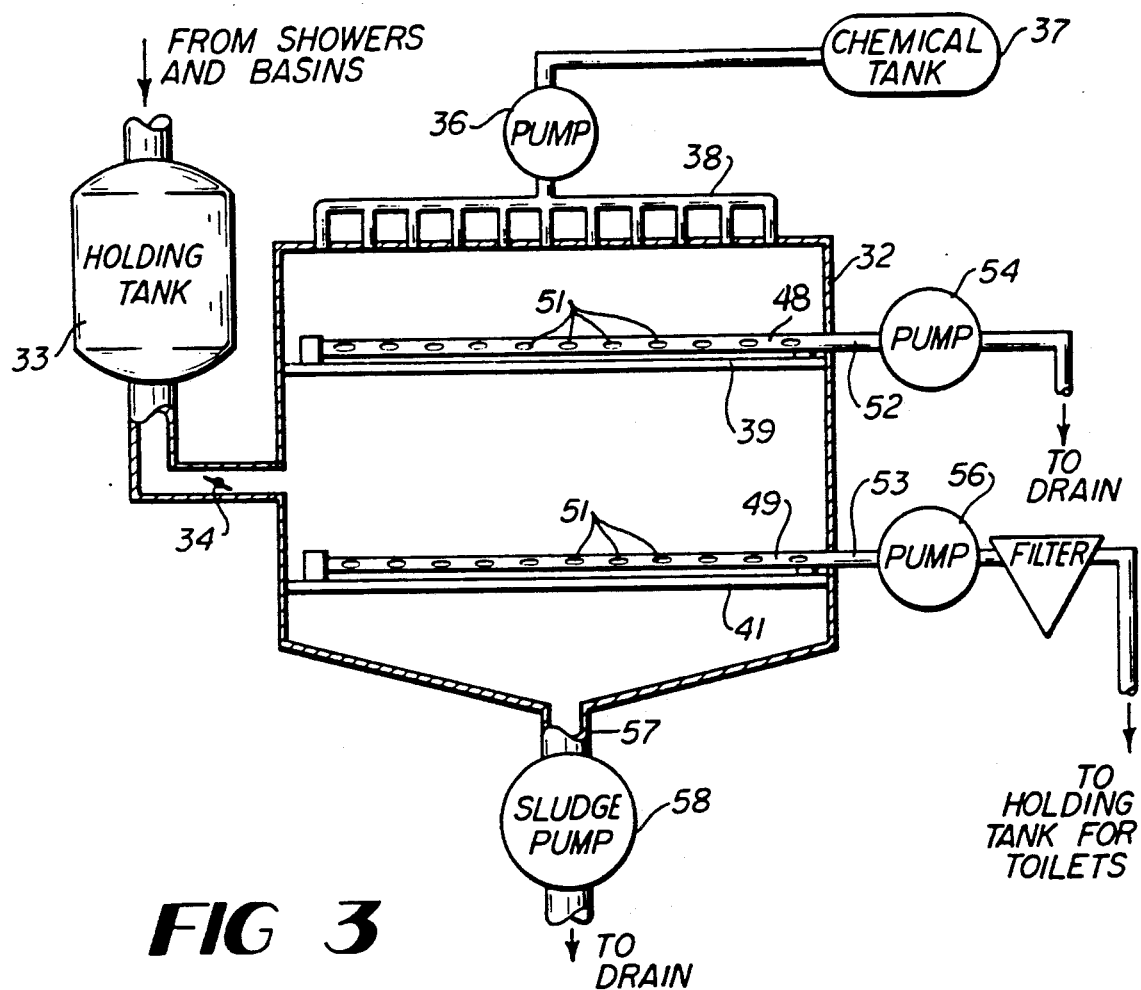
FIG. 3 is a diagrammatical partially sectional illustration of a second embodiment of the apparatus of the invention for high volume commercial use.

FIG. 3 illustrates a second embodiment of the invention for high volume or commercial use. This embodiment includes a tank 32 for receiving gray water from showers and basins. A holding tank 33 is provided for receiving and temporarily holding excess gray water and a valve 34 can be actuated to introduce water from the holding tank 33 into the tank 32 for subsequent processing. A chemical pump 36 is adapted to pump a cleaning agent from the chemical tank 37 through a distribution manifold 38 and into the tank 32 as needed to treat and cleanse gray water therein. The pump 36 can be either actuated manually, at periodic timed intervals or upon detection of gray water flow into the tank 32 as in the embodiment of FIG. 1 depending upon the particular application.

Figure 4:
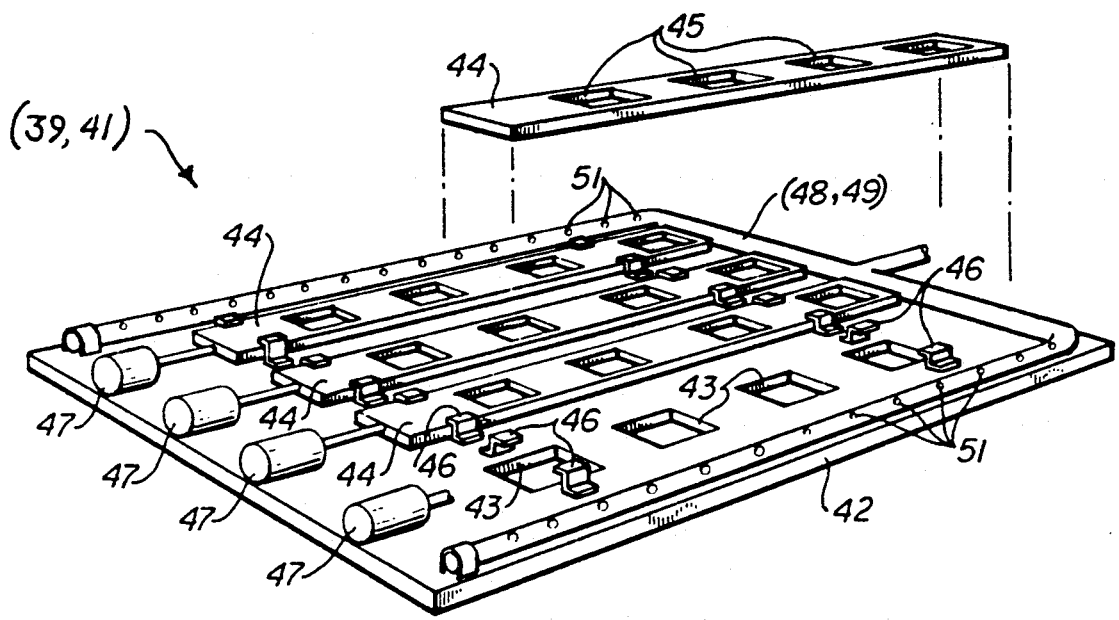
FIG. 4 is a perspective partially exploded view of a shutter valve assembly for use in the embodiment of FIG. 3.

An upper shuttle valve assembly 39 (FIG. 4) and a lower shutter valve assembly 41 are positioned within the tank 32 in substantially spaced parallel relationship. The shutter valve assemblies 39 and 41 are configured to isolate the lower, middle and upper portions of the tank 32 for extraction of floating contaminants, sinking contaminants and cleansed gray water as detailed below. In this regard, and referring to FIG. 4, each shutter valve assembly comprises a valve plate 42 having sets of aligned openings 43 formed therethrough. A corresponding set of elongated shutter plates 44 are slidably disposed atop the plate 42 generally covering the sets of openings 43 therein.

The shutter plates 44 are slidably secured to the plate 42 by sets of brackets 46 that allow each shutter plate 44 to slide between a first position wherein the shutter plate openings 45 align with plate openings 43 opening communication through the shutter valve assembly and a second position wherein the openings 45 align between the openings 43 closing communication through the shutter valve assembly. Suitable control means such as pneumatic or hydraulic cylinders 47 are mounted to the plate and coupled to the shutter plates 44 for selectively moving the shutter between their first and second positions. The cylinders 47 are preferably operable through a remote switch (not shown) that, in turn, can be operated by a computer or other suitable control system to open and close the valve assemblies. With this configuration, it can be seen that the shutter valve assemblies 39 and 41 function to isolate the top and bottom portions of the tank 32 from the central portion thereof when the shutter plates 44 of each assembly are closed, and open up communication between all sections of the tank 32 when the assemblies are opened.

Mounted atop each shutter valve assembly 39 and 41 is a respective manifold 48 and 49 that has opposed legs extending along opposed edges of plate 42 with each leg bearing a set of holes 51 communicating with the interior of the manifolds. A conduit 52 communicates with the upper manifold 48 and, similarly, a conduit 53 communicates with the lower manifold 49 with conduits 52 and 53 extending out of the tank 32. A pump 54 is coupled to draw liquid through the openings 51 of the upper manifold 48 and deliver such liquid to a drain as shown. Similarly, a pump 56 is coupled to draw water through the holes 51 of lower manifold 49 and deliver such water through a filter to toilet reservoirs for use in flushing toilets.

A drain pipe 57 communicates with the tank at its bottom and a sludge pump 58 is coupled to draw liquid and precipitated contaminants through the drain pipe 57 and direct such contaminant bearing liquid to a sewer or other suitable disposal site.

OPERATION

The operation of the invention will first be described with reference to the embodiment of FIGS. 1 and 2. Specifically with reference to FIG. 2, gray water from showers, basins and the like is directed through conduit 13 and into the tank 12 as indicated by arrows 20. As the gray water flows through the conduit 13, it passes a depending paddle 15 that extends into the flow from flow switch 14 mounted to the conduit. The force of the flow moves the paddle to the right in FIG. 2 which activates an electrical switch within flow switch 14 to direct operating current to the chemical pump 16. In response, the pump 16 draws a cleansing agent such as chlorine from the chemical tank and injects it into the flow of gray water entering the tank as shown. When gray water ceases to flow through the conduit 13, as when one's shower is finished, the paddle 15 again returns to its vertical orientation which deactivates the pump 16 and ceases injection of cleaning agent into the conduit 13. Preferably, the pump 16 is equipped for adjustment of the pumping rate so that the volume of cleaning agent injected into the flow can be varied to provide the most efficient cleansing effect.

As the gray water stands within the tank 12, floating contaminants such as soap scum tend to migrate to the surface of the water while sinking contaminants such as hair, food particles or the like tend to precipitate to the bottom of the tank. Thus, gray water disposed intermediate the bottom of the tank and the water's surface becomes relatively contaminant free and, further, relatively bacteria free by virtue of the action of the cleansing agent.

As additional gray water is delivered to the tank, the surface of water in the tank eventually reaches the level of the second conduit 21 whereupon surface liquid, which bears floating contaminants, flows through the conduit 21 and is directed to a drain for disposal. Floating contaminants are therefore continually extracted from the tank and disposed of as additional gray water is delivered to the tank from showers and basins. To extract sinking contaminants from the bottom of the tank, the valve 24 can be selectively activated to drain a measured amount of liquid bearing such precipitated contaminants from the tank bottom whereupon the valve 24 can be reclosed to prevent escape of relatively clean intermediate gray water from the tank. In actual use, removal of precipitated contaminants in this manner has been found necessary only occasionally to prevent excess build-up of such contaminants in the tank bottom. As with the floating contaminants, these extracted precipitated contaminants are delivered to a drain for disposal.

Upon water demand from a toilet when flushed, the pressure pump 26 is activated to draw water from the tank 12 and deliver it to the toilet for refilling the toilets reservoir in preparation for the next flush. The conduit 27 communicates with the tank at a distance from its bottom sufficient to avoid drawing precipitated contaminants through the filter and pressure pump and to insure that only the relatively clean gray water intermediate the tank bottom and the waters surface is directed to toilets.

Under some conditions, such as when a number of guests are visiting, water demand from flushing toilets can exceed the rate at which gray water is introduced to the tank from showers and basins. Under these conditions, the tank can obviously become depleted rapidly which can result in a lack of water for flushing toilets and destruction of the pump 26. To prevent such, the tank is provided with a source of fresh water through a water pipe 29 that is coupled to the pressurized water supply system of the building. A float valve assembly 31 is coupled to the pipe 29 within the tank to inject fresh water into the tank through the pipe 29 when the water level therein falls below a predetermined level that is slightly above the point at which conduit 27 communicates with the tank. Specifically, as the water level in the tank begins to drop, the float of float valve assembly 31 floats downwardly with the water's surface until, at a predetermined position of the float, the valve of assembly 31 is opened to inject fresh water into the tank. Such float valve assemblies are commonly available and are typically used to control the water level in toilet bowl reservoirs. In this way, water is always available from the tank 12 for use in flushing toilets even during times of peak flushing demand.

The embodiment of FIG. 3 operates in a manner similar to that of FIGS. 1 and 2. Gray water from showers and basins is introduced into the tank 32 from an intermediate holding tank 33 until the tank 32 is filled. During the filling process, the shutter valve assemblies 39 and 41 are open to allow all portions of the tank to fill with gray water. Further, a cleaning agent is injected into the tank 32 during the filling process such that the cleaning agent is thoroughly mixed with the gray water in the tank.

After a time sufficient to allow floating contaminants to migrate to the top of the tank in the area above the upper shutter valve assembly 39 and sinking contaminants to precipitate to the bottom of the tank below the lower shutter value assembly 41, the shutter valve assemblies 39 and 41 are closed off to isolate the top and bottom of the tank from its central portion and thus isolate contaminated liquid in the top and bottom of the tank from relatively clean gray water in the central portion thereof. Pumps 54 and 58 can then be actuated to pump contaminants from the upper and lower sections of the tank to a drain for disposal while pump 56 is actuated to draw relatively clean gray water from the central portion of the tank to a remote location such as a holding tank for use in flushing toilets.

With the tank 32 thus emptied, the shutter valve assemblies 39 and 41 can again be opened whereupon the cycle repeats with gray water from holding tank 33 being introduced into and filling tank 32. The embodiment of FIG. 3 is thus adaptable for use in high volume or commercial conditions, such as in hotels, where large quantities of gray water are typically available at about the same time of day, because such gray water can be collected in holding tank 33 and subsequently delivered to the tank 32 for rapid processing as described.

The invention has been described in terms of preferred embodiments. It will be obvious to those of skill in the art, however, that various additions, deletions and modifications could be made to the illustrated embodiments within the scope of the invention. The liquid cleaning agent injection method, for example, might be replaced by a solid dissolving type chemical suspended in the gray water within the tank. In addition, various control systems for controlling and timing the operation of valves and pumps could be added since such control systems are commonly used in such applications. Further, while the invention has been described with respect to reclaiming gray water for use in flushing toilets, it will be clear that the reclaimed water could be used for any other applicable purposes. Finally, the term gray water as used herein is intended to include any appropriate reclaimable water such as rain water and thus is not limited to water from showers and basins. These and many other modifications might easily be made to the preferred embodiments by skilled artisans without departing from the spirit and scope of the invention as set forth in the claims.

I claim:

1. An apparatus for cleansing gray water and reclaiming the cleansed water for reuse with said apparatus comprising:
   a receptacle for receiving and containing gray water;
   conduit means for delivering gray water to said receptacle;
   means for extracting floating contaminants from the surface of gray water within said receptacle;
   means for extracting precipitated contaminants from the bottom of gray water within said receptacle;
   means for drawing cleansed gray water from said receptacle for reuse; and
   a first shutter valve means within said receptacle for selectively isolating floating contaminants from gray water within said receptacle for extraction.

2. The apparatus of claim 1 and further comprising pump means for pumping isolated surface liquid from said receptacle.

3. The apparatus of claim 1 and further comprising a second shutter valve means within said receptacle for selectively isolating precipitated contaminant bearing liquid from gray water within said receptacle.

4. The apparatus of claim 3 and further comprising pump means for pumping isolated precipitated contaminant bearing liquid from said receptacle.

5. A method of cleansing gray water and reclaiming the cleansed water for reuse with said method comprising the steps of:
   (a) directing gray water from a source into a receptacle;
   (b) allowing the gray water to stand within the receptacle until floating contaminants have migrated to the surface of the gray water and sinking contaminants have precipitated to the bottom of the receptacle;
   (c) isolating the floating contaminants from gray water within the receptacle and pumping the isolated floating contaminants from the receptacle for disposal;
   (d) periodically extracting the sinking contaminants from the bottom of the receptacle and directing the sinking contaminants to a drain; and
   (e) drawing the remaining substantially contaminant free gray water from the receptacle and directing it to a remote location for reuse.

6. The method of claim 5 wherein step (d) comprises isolating the sinking contaminants from gray water within the receptacle and pumping the isolated sinking contaminants from the receptacle for disposal.

* * * * *